United States Patent [19]

Mayne et al.

[11] Patent Number: 4,463,300

[45] Date of Patent: Jul. 31, 1984

[54] LINEAR MOTOR DIGITAL SERVO CONTROL

[75] Inventors: David W. Mayne, San Juan Capistrano; Alan K. Jennings, Orange, both of Calif.

[73] Assignee: Printronix, Inc., Irvine, Calif.

[21] Appl. No.: 303,082

[22] Filed: Sep. 17, 1981

[51] Int. Cl.³ .............................................. G05B 11/00
[52] U.S. Cl. .................................. 318/687; 318/135; 318/603; 318/282
[58] Field of Search ............... 318/687, 686, 119, 135, 318/600, 601, 603, 626, 652, 282

[56] References Cited

U.S. PATENT DOCUMENTS

| 4,179,223 | 12/1979 | Kwan et al. | 318/282 X |
| 4,182,980 | 1/1980 | Tholome | 318/626 X |
| 4,239,403 | 12/1980 | Matula et al. | 400/322 |
| 4,250,439 | 2/1981 | Hohmann | 318/601 |
| 4,359,289 | 11/1982 | Barrus et al. | 400/322 |
| 4,374,351 | 2/1983 | Fishman et al. | 318/600 |

*Primary Examiner*—B. Dobeck
*Attorney, Agent, or Firm*—Fraser and Bogucki

[57] ABSTRACT

A linear motor which mounts and drives a hammer bank shuttle assembly in reciprocating fashion within a dot matrix line printer is controlled by a digital servo. The digital servo includes an encoder for generating a pulse each time the shuttle assembly passes one of a succession of different positions along a linear path of movement therefor together with apparatus for measuring the time intervals between successive pulses, comparing the time intervals with a reference value, generating error signals in accordance with the difference and applying the error signals to vary the durations of driving pulses applied to the linear motor. Whenever the shuttle assembly reaches either of opposite end positions along the path of linear movement, the digital servo provides to the linear motor a turnaround signal of predetermined value which drives the linear motor through rebounding from an elastomeric stop member independent of the actual speed of the shuttle assembly and in a manner which is designed to compensate for friction losses during the rebounding. Following each rebounding of the linear motor from an elastomeric stop member the speed of the shuttle assembly is measured, stored and subsequently applied to adjust the value of the turnaround signal applied to the linear motor during the immediately following rebounding of the linear motor from the same elastomeric stop member.

14 Claims, 12 Drawing Figures

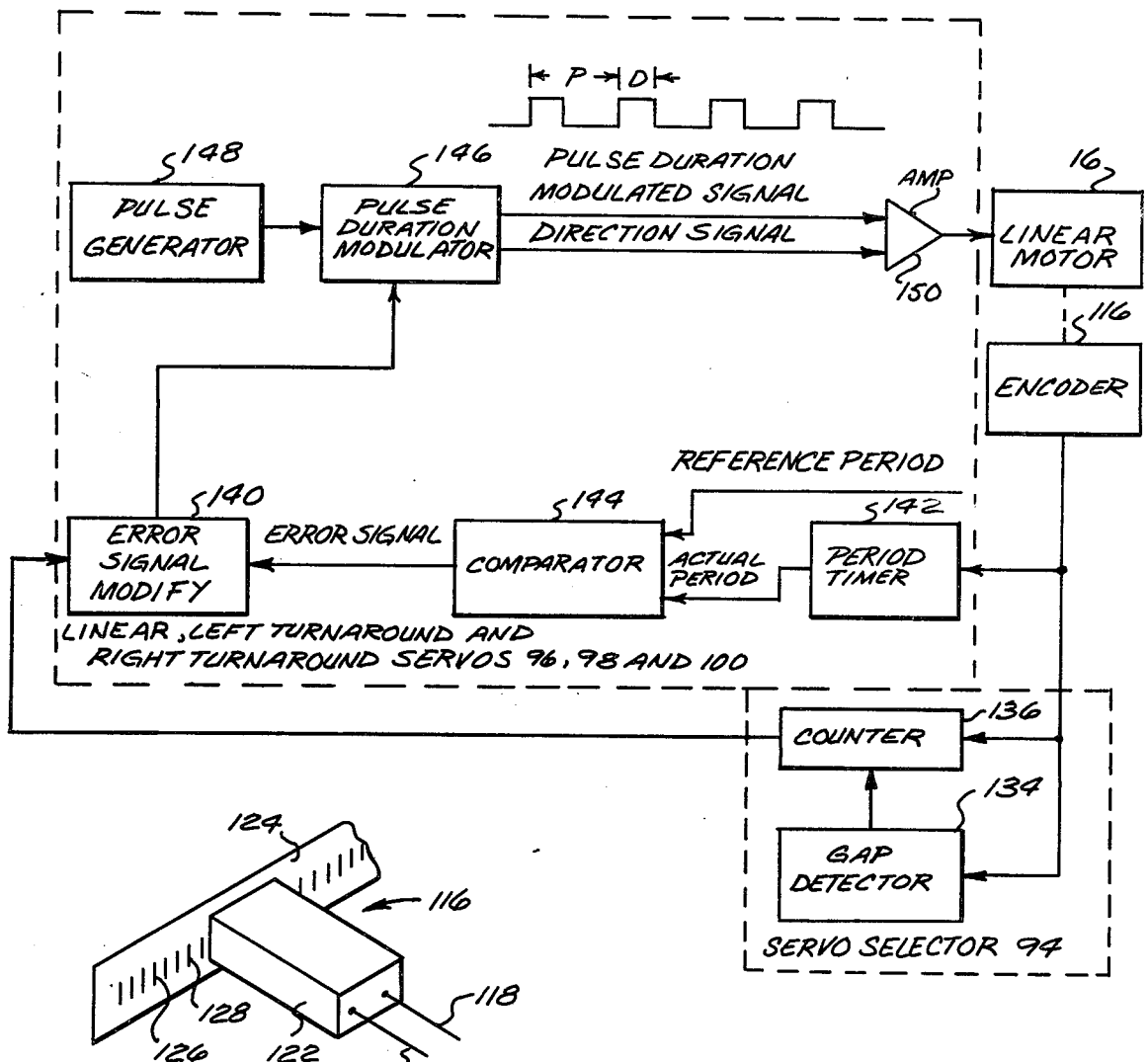
FIG.4
FIG.3
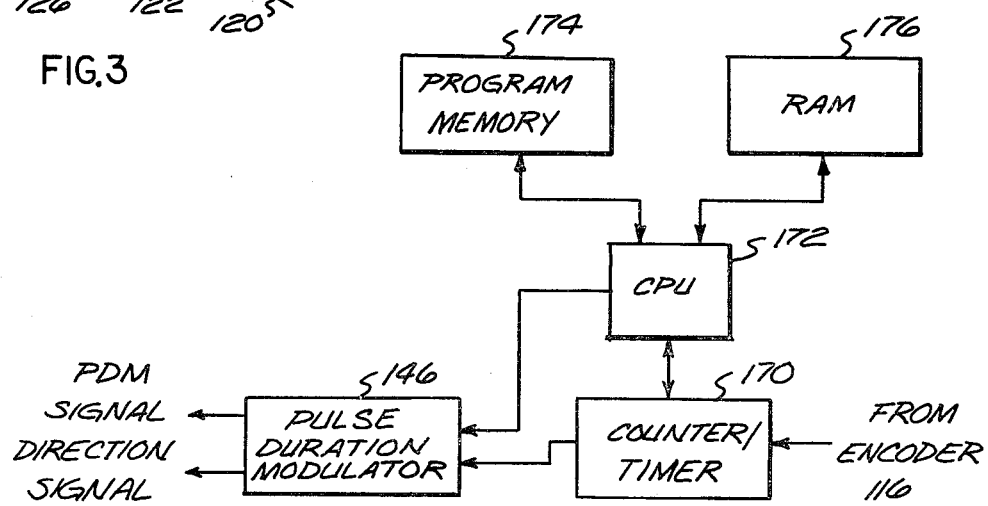
FIG.6

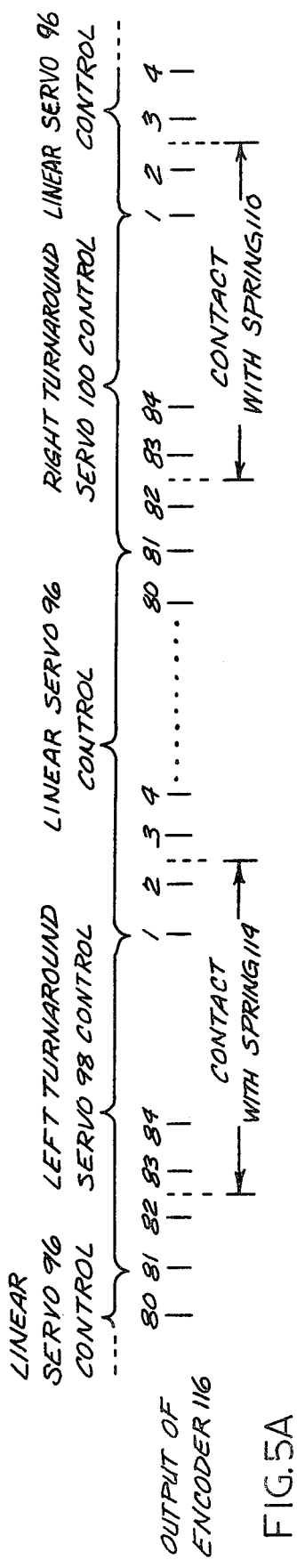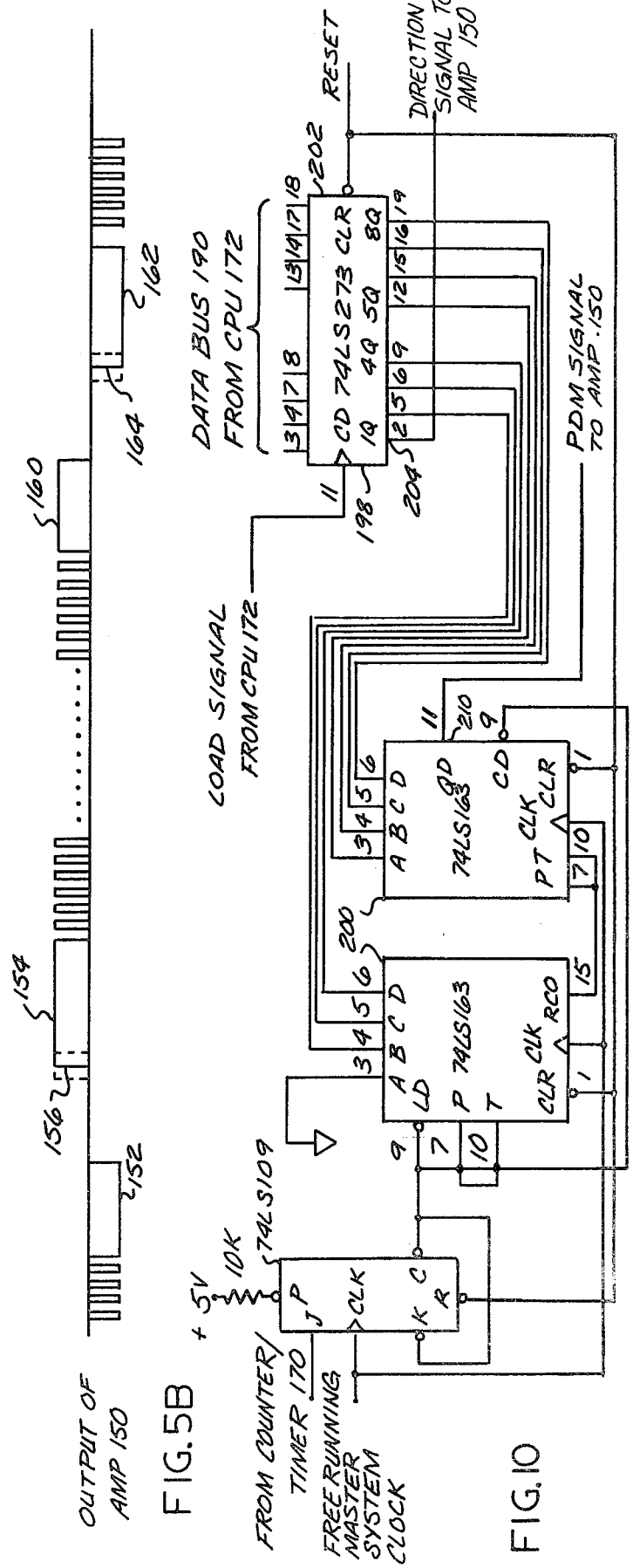
FIG.5A
FIG.5B
FIG.10

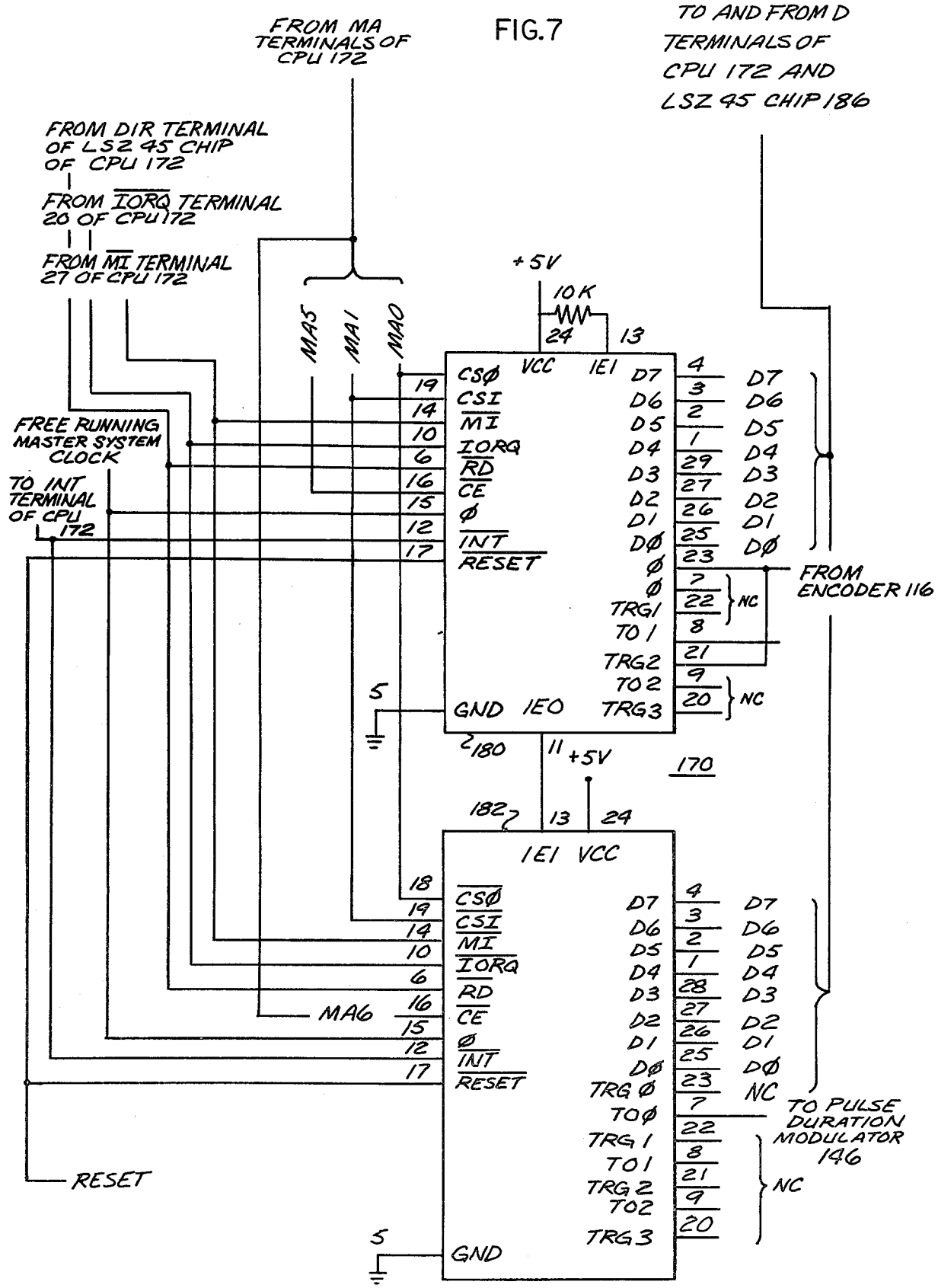

LINEAR MOTOR DIGITAL SERVO CONTROL

BACKGROUND OF THE INVENTION

1. Field of the Invention

The present invention relates to arrangements for driving linear motors which move along a linear path of motion, and more particularly to servo arrangements for driving linear motors which move along a linear path of motion and rebound from opposite elastomeric stops.

2. History of the Prior Art

U.S. Pat. No. 4,359,289 of Gordon B. Bararus and Jerry Matula, issued Nov. 16, 1982 and commonly assigned with the present application, describes an arrangement for driving a hammer bank shuttle assembly in reciprocating fashion in a dot matrix line printer. The shuttle assembly forms part of a counterbalanced shuttle drive with a mounting frame therefor being disposed in contact with a spaced-apart pair of rotatable pulleys. A counterbalancing bar is disposed in contact with the pulleys on the opposite sides thereof from the shuttle assembly. The shuttle assembly mounting frame and the counterbalancing bar are held in contact with the pulleys by a flexible band which encircles the pulleys and is fastened to the shuttle assembly mounting frame and the counterbalancing bar and by the magnetic attraction provided by one or more permanent magnets which together with pole pieces are mounted adjacent the shuttle assembly mounting frame and the counterbalancing bar. The permanent magnet provides a flow of magnetic flux through the counterbalancing bar or the shuttle assembly mounting frame or both so as to interact with one or more coils mounted on the counterbalancing bar so as to lie within the flux path. Energization of the coils drives the shuttle assembly in either of opposite directions along a linear path of motion. A pair of stops utilizing springs or other elastomeric elements are positioned so as to be impacted by the shuttle assembly mounting frame or the counterbalancing bar or both when the shuttle assembly reaches opposite limits of movement along the linear path. Each time the arrangement rebounds from one of the stops, the coils are energized so as to drive the shuttle assembly along the linear path of motion at a desired nominal speed.

An alternative arrangement of a counterbalanced bidirectional shuttle drive is shown in U.S. Pat. No. 4,239,403 of Jerry Matula, Glen R. Radke and Gordon B. Barrus, issued Dec. 16, 1980 and commonly assigned with the present application. Such alternative arrangement also utilizes a counterbalancing bar disposed on the opposite sides of a pair of pulleys from the shuttle assembly and opposite elastomeric stops. The arrangement is driven by a motor coupled to rotatably drive one of the pulleys.

As described in U.S. Pat. No. 4,359,289 of Barrus et al, the coils of the electromagnetic motor arrangement are energized by an analog servo which responds at all times to the speed of the shuttle assembly. An encoder is disposed so as to generate pulses in response to the passage of identifiable marks relative to a sensor as the shuttle assembly undergoes motion. The pulses are utilized to determine the actual speed of the shuttle assembly which is in turn compared with a reference and the difference used to vary the drive current to the coils. The drive current as so varied maintains the shuttle assembly at a desired nominal speed as the shuttle assembly sweeps in either of opposite directions through the linear path of motion. When the shuttle assembly reaches the end of its travel in either direction and an elastomeric stop is impacted, the shuttle assembly rapidly decelerates to rest. The servo system senses the rapid deceleration and responds by producing a pulse which tends to drive the arrangement harder into the elastomeric stop. When the arrangement has come to rest and begins accelerating in the opposite direction as it rebounds from the elastomeric stop, the servo again senses the fact that the shuttle assembly is well below the desired nominal speed and responds by generating a pulse in a direction which tends to quickly accelerate the shuttle assembly to the nominal speed in the new direction.

During control of the shuttle assembly in the linear region along the linear path of motion in the arrangement shown in U.S. Pat. No. 4,359,289 of Barrus et al, the analog servo generally remains unsaturated and reacts to the constant measurements of speed by comparing such measurements with the reference and providing the relatively small amount of current typically required to maintain the shuttle assembly moving at the desired nominal speed. During turnaround, however, when the servo senses speeds well below the nominal speed, the servo typically saturates while in the process of generating the large corrective pulses of first one polarity and then the other polarity in the manner described above. This tendency of the servo to saturate, particularly at higher operating speeds where the sudden deceleration and following acceleration of the shuttle assembly constitutes an even greater departure from the desired nominal speed results in a tendency to overdrive the shuttle assembly during turnaround. At the very least the operation during turnaround tends to be inefficient. In more serious cases effective control over the shuttle assembly is actually lost over part or in some cases all of the range of movement of the shuttle assembly.

Accordingly, it would be desirable to provide an improved servo for controlling a linear motor such as one which constantly rebounds at the opposite ends of a linear path of motion. Such servo should be capable of driving the linear motor effectively and efficiently during the rebounding turnarounds as well as during the linear regions of operation.

BRIEF DESCRIPTION OF THE INVENTION

Servo controls in accordance with the invention utilize a digital servo for controlling the linear motor in arrangements such as those previously described for reciprocating a shuttle assembly. The digital servo responds to pulses generated at each of a succession of different locations of the shuttle assembly along the linear path of motion so as to continuously compute the actual speed of the shuttle assembly and compare it with a reference. The difference is used to generate an error signal which is applied to modulate the duration of a succession of pulses applied to the linear motor so as to maintain a desired nominal speed.

In servo controls according to the invention, the digital servo functions as three different servos depending on the location of the shuttle assembly. When the shuttle assembly is between opposite end locations along the linear path, the servo functions as a linear servo. Whenever the shuttle assembly reaches either of the opposite end locations however, the servo ceases responding to the actual speed of the shuttle assembly and provides a turnaround signal waveform of predetermined value to the linear motor. The signal waveform is applied to the linear motor without regard to the actual speed of the shuttle assembly and is designed to compensate for friction losses as the linear motor arrangement which includes the shuttle assembly approaches and then rebounds from opposite elastomeric stops. Ideally, the servo allows the linear motor arrangement to undergo the turnaround in a very fast and efficient manner so that the desired nominal speed is achieved and maintained as quickly and efficiently as possible. Thus, when the shuttle assembly is beyond either of the opposite end locations, the servo control operates as a left turnaround or a right turnaround servo.

In accordance with the invention the actual speed of the shuttle assembly is sampled following each rebound, and the sampled value is stored. The next time the shuttle assembly prepares to impact the same elastomeric stop, the stored value is used to adjust the value of the turnaround signal so that the turnaround will be executed and the nominal speed thereafter reached with optimum efficiency.

In a preferred embodiment of a linear motor with digital servo control in accordance with the invention an encoder is used to generate a pulse at each of a succession of locations of the shuttle assembly along the linear path of motion. The servo control measures the time interval between each successive pair of pulses and compares the interval with a reference value. The difference in the form of an error signal is modified in accordance with a predetermined algorithm to compensate for various system parameters before being applied to modulate the duration of each of a succession of pulses applied to drive the linear motor.

The pulses generated by the encoder are counted in order to determine when the shuttle assembly has reached an end location at either of the opposite ends of the linear path of motion. At that point the servo terminates control in response to the encoder pulses and instead generates a turnaround signal of predetermined value independent of the shuttle speed. The predetermined turnaround signal consists of a pair of pulses of opposite polarity timed so as to be applied to the linear motor before and during impact with the elastomeric stop. The pulses have a duration and an amplitude which are selected based upon the known rebound characteristics of the linear motor at each end so as to optimize the process of decelerating the shuttle assembly to rest and then accelerating it back to the desired nominal speed. The effectiveness of the predetermined turnaround signal is continuously monitored by measuring the actual speed of the shuttle assembly at the end of each turnaround. This is done by measuring the interval between a successive pair of encoder pulses at the end of the turnaround interval. The measured time interval is stored and is applied to modify the predetermined turnaround signal as necessary the next time that the linear motor prepares to impact the same elastomeric stop. The predetermined turnaround signal is modified in the present example by altering the position of the leading edge of the second of the pair of pulses of opposite polarity using the previously measured and stored time interval in accordance with a selected algorithm.

BRIEF DESCRIPTION OF THE DRAWINGS

The foregoing and other objects, features and advantages of the invention will be apparent from the following more particular description of a preferred embodiment of the invention, as illustrated in the accompanying in which:

FIG. 3 is a perspective view of the encoder of the servo control of FIGS. 1 and 2;

FIG. 4 is a block diagram of a preferred form of the servo selector and the various servos of FIG. 1;

FIGS. 5A and 5B are waveforms useful in explaining the operation, of the arrangement shown in FIG. 4;

FIG. 6 is a basic block diagram of one circuit arrangement which may be used in implementing the arrangement of FIG. 4;

FIG. 7 is a schematic diagram of a circuit which may be used as the counter/timer in the arrangement of FIG. 6;

FIG. 10 is a schematic diagram of a circuit which may be used as the pulse duration modulator in the arrangement of FIG. 6.

DETAILED DESCRIPTION

Figure 1:
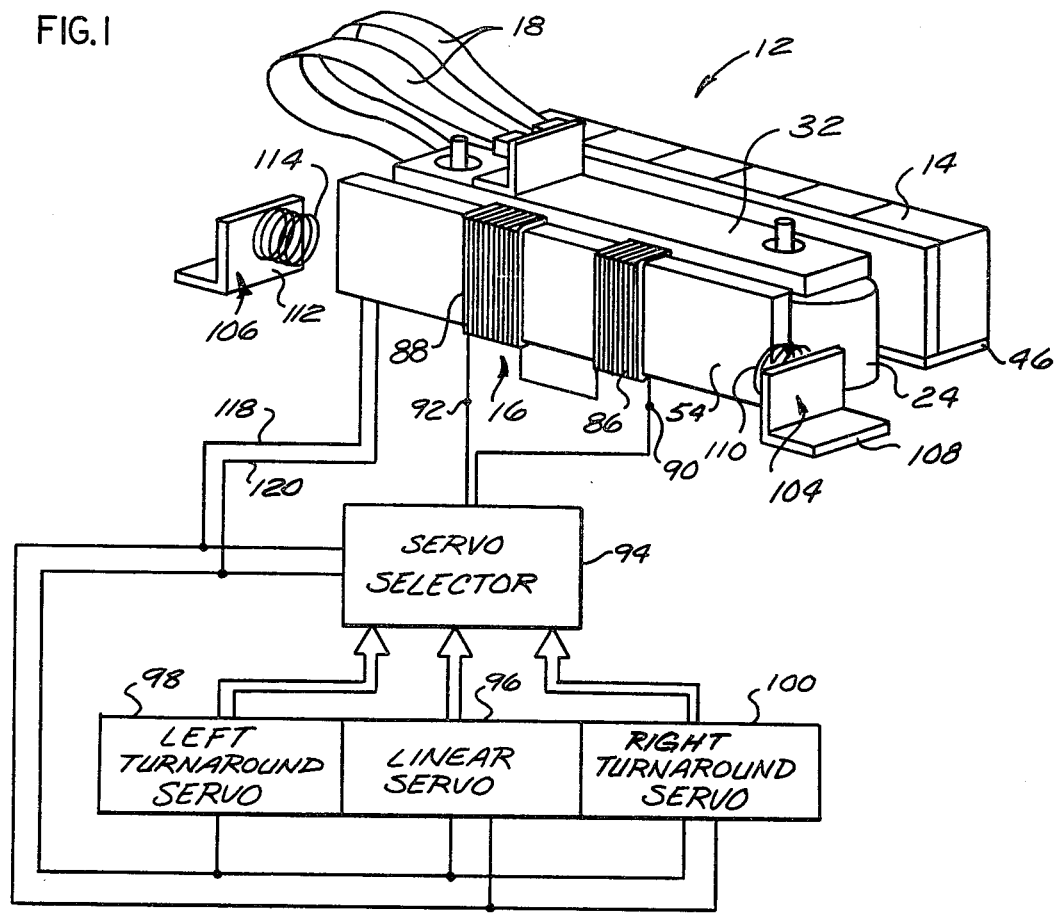
FIG. 1 is a combined perspective view and block diagram of a shuttle assembly-carrying linear motor with digital servo control in accordance with the invention.

FIG. 1 depicts a shuttle drive 12 which includes a shuttle assembly 14 and a linear motor 16. The shuttle drive 12 and included shuttle assembly 14 and linear motor 16 are shown in much greater detail in the previously referred to U.S. Pat. No. 4,359,289 of Barrus et al, and accordingly will only be briefly described herein.

A wire bus 18 is coupled to the shuttle assembly 14 to provide electrical connection therewith. As described in the previously referred application of Barrus et al, the shuttle assembly 14 selectively impacts and thereby imprints on a print paper via an ink ribbon. As such, it is necessary for the shuttle assembly 14 to undergo reciprocating motion along a linear path of motion.

Figure 2:
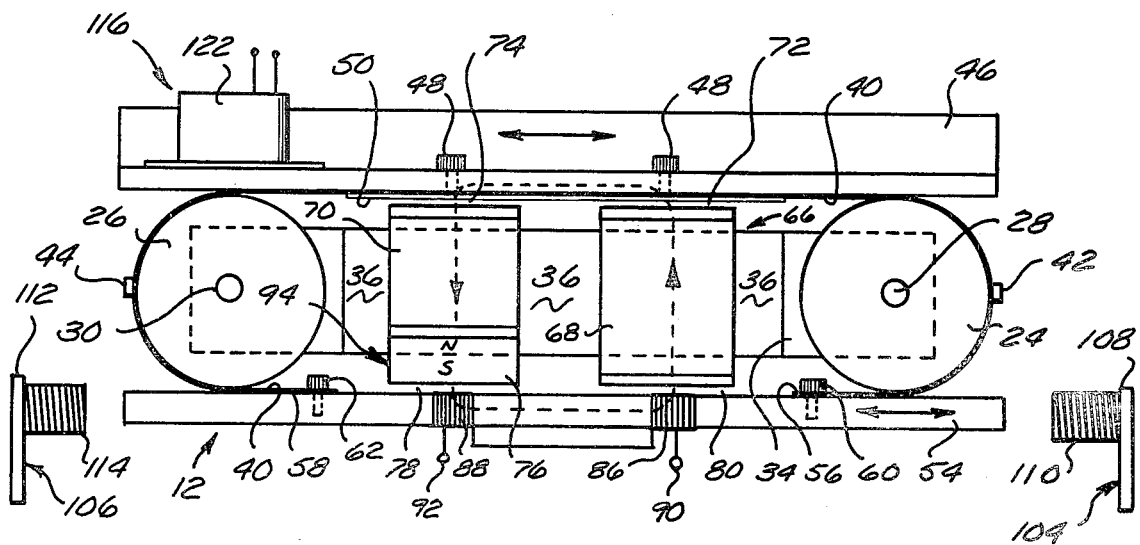
FIG. 2 is a top view of the linear motor of FIG. 1 with the top frame removed for clarity of illustration.

As best seen in FIG. 2, the shuttle drive 12 includes a pair of pulleys 24 and 26 mounted for rotation about a pair of spaced-apart, generally parallel vertical axes. The pulley 24 is mounted for rotation by a shaft 28, and the pulley 26 is mounted for rotation by a shaft 30. The shafts 28 and 30 are journaled in the opposite ends of a top frame 32 (not shown in FIG. 2) and a bottom frame 34 extending along the length of the shuttle drive 12. The top frame 32 is mounted on top of three intermediate frame members 36 extending vertically upwardly from the bottom frame 34.

A taut band 40 of uniform width is formed into a loop which partially encircles the pulleys 24 and 26 and extends between the pulleys 24 and 26 on one side thereof as shown in FIG. 2. The band 40 which moves in response to rotation of the pulleys 24 and 26 is coupled to the pulleys 24 and 26 by screws 42 and 44 respectively. The screws 42 and 44 insure vertical registration of the band 40 with the pulleys 24 and 26 while at the same time permitting the limited movement of the band 40 necessary to reciprocate the shuttle assembly 14.

The shuttle assembly 14 which is not shown in FIG. 2 for clarity of illustration is coupled to a portion of the band 40 between the pulleys 24 and 26 on one side of the pulleys 24 and 26 by a generally L-shaped shuttle mounting frame 46. The shuttle mounting frame 46 which has a length greater than the distance between the pulley shafts 28 and 30 to provide for contact of the frame 46 with the opposite pulleys 24 and 26 through the band 40 during the limited movement undergone by the shuttle assembly 14 is coupled to the band 40 by any appropriate means. In the present example, as shown in FIG. 2, a pair of screws 48 extend through the frame 46 and through the band 40 and into a relatively thin plate 50 on the opposite side of the band 40 from the frame 46 to secure the frame 46 to the band 40.

An elongated, counterbalancing bar 54 is disposed in contact with the pulleys 24 and 26 on the opposite side of the pulleys 24 and 26 from the frame 46 and has opposite ends 56 and 58 of the band 40 secured thereto by screws 60 and 62 respectively. Like the shuttle assembly mounting frame 46, the counterbalancing bar 54 has a length greater than the distance between the pulley shafts 28 and 30 so as to remain in contact with the pulleys 24 and 26 through adjacent portions of the band 40 during the limited reciprocating movement of the shuttle assembly 14. The counterbalancing bar 54 which is similar in size and shape to the shuttle assembly 14 and its included mounting frame 46 is chosen to have a mass substantially the same as that of the shuttle assembly 14 with included mounting frame 46.

The shuttle mounting frame 46 has the opposite ends thereof held in contact with the pulleys 24 and 26 through adjacent portions of the band 40 by a magnet assembly 66. The magnet assembly 66 also holds the opposite ends of the counterbalancing bar 54 in contact with the pulleys 24 and 26 through adjacent portions of the band 40. The magnet assembly 66 includes first and second pole pieces 68 and 70 disposed between adjacent ones of the intermediate frame members 36 and forming air gaps 72 and 74 respectively with the frame 46. The pole piece 68 is longer than the pole piece 70. A permanent magnet 76 is coupled to the pole piece 70 at the end of the pole piece 70 opposite the mounting frame 46. The permanent magnet 76 has a north pole in contact with the pole piece 70 and an opposite south pole disposed adjacent and forming an air gap 78 with the counterbalancing bar 54. The end of the pole piece 68 opposite the mounting frame 46 forms an air gap 80 with the counterbalancing bar 54.

The magnet assembly 66 provides a flow of magnetic flux through a path which includes portions of the frame 46 and the counterbalancing bar 54 which are of magnetic material. The flow path for the magnetic flux is shown in dotted outline in FIG. 2. The polarity of the permanent magnet 74 is such that flux flows from the permanent magnet 76 across the air gap 78 and into the bar 54. From that point the flux flows along the length of the bar 54 to the region of the air gap 80, where the flux crosses the gap 80 and flows into the pole piece 68 and through the air gap 72 into the frame 46. From this point, the flux flows along the length of the frame 46 to the region of the air gap 74. The flux flows across the air gap 74 and through the pole piece 70 to the permanent magnet 74 to complete the flux path. The flow of magnetic flux provided by the magnet assembly 66 exerts attractive forces on the frame 46 and the counterbalancing bar 54 which tend to pull the frame 46 toward the pole pieces 68 and 70 and the bar 54 toward the magnet 76 and the pole piece 68. Such forces hold the frame 46 and the bar 54 in contact with the opposite pulleys 24 and 26.

The pole pieces 68 and 70 and the magnet 76 form a linear motor together with a pair of coils 86 and 88. The coil 86 is wound on the counterbalancing bar 54 so as to be disposed within the air gap 80. The coil 88 is wound on the counterbalancing bar 54 so as to be disposed within the air gap 78. The coils 86 and 88 are wound on the bar 54 in opposing polarity, and one lead of each is coupled together to form a series coupling of the coils 86 and 88. The other lead of each of the coils 86 and 88 is coupled to a terminal 90 and a terminal 92 respectively. The terminals 90 and 92 are coupled by a servo selector 94 to a linear servo 96, a left turnaround servo 98 or a right turnaround servo 100 as shown in FIG. 1. The servos 96, 98 or 100 apply a signal to the terminals 90 and 92 to drive the counterbalancing bar 54 in one direction or the other depending upon the polarity of the applied signal. When the signal applied to the terminals 90 and 92 causes current to flow upwardly within the portion of the coil 88 in the air gap 78 and downwardly in the portion of the coil 86 within the air gap 80, such currents interact with the flux in the gaps 78 and 80 to force the bar 54 in a direction to the right as seen in FIGS. 1 and 2. Conversely, when the signal applied to the terminals 90 and 92 reverses polarity such that current within the portion of the coil 88 in the air gap 78 flows downwardly and current in the portion of the coil 86 within the air gap 80 flows upwardly, such currents interact with the flux in the gaps 78 and 80 to produce a force on the bar 54 to move it to the left as seen in FIGS. 1 and 2.

Opposite limits of movement of the shuttle drive 12 along its linear path of motion are defined by a pair of stops 104 and 106 mounted adjacent the opposite ends of the counterbalancing bar 54. The stop 104 includes a generally L-shaped frame 108 having an elastomeric stop element in the form of a spring 110 mounted thereon and disposed in a linear path of motion for the bar 54. In like fashion the stop 106 includes an L-shaped frame 112 and an elastomeric stop element in the form of a spring 114 mounted thereon and disposed within the linear path of motion of the bar 54. The springs 110 and 114 are alternately impacted by the opposite ends of the counterbalancing bar 54 as the bar 54 reciprocates in response to energization of the coils 86 and 88.

The stops 104 and 106 are shown at the opposite ends of the counterbalancing bar 54 by way of example only, and it should be understood that the stops could alternatively be located at the opposite ends of the frame 112 or adjacent one end of both the bar 54 and the frame 112.

In accordance with the invention one of the three different servos 96, 98 and 100 is applied by the servo selector 94 to drive the shuttle drive 12 depending upon the location of the shuttle assembly 14 within its linear path of motion. Within the linear region in which the opposite ends of the counterbalancing bar 54 have not come into contact with the springs 110 and 114, the servo selector 94 couples the linear servo 96 to control the shuttle drive 12. As described hereinafter, the linear servo 96 continually monitors the speed of the shuttle assembly 14 using an encoder (not shown in FIG. 1) coupled to the linear servo 96 by a pair of leads 118 and 120. The linear servo 96 compares each speed measurement with a reference and applies the difference in the form of an error signal to modulate the duration of pulses periodically applied to the coils 86 and 88. When the shuttle assembly 14 reaches either of a pair of opposite end locations near the opposite ends of the linear path of motion, control of the shuttle drive 12 is handed from the linear servo 96 to the left turnaround servo 98 or the right turnaround servo 100. The opposite end locations for the shuttle assembly 14 are defined by positions of the counterbalancing bar 54 just prior to contacting of the ends of the bar 54 with the springs 110 and 114. Such end locations are determined by the servo selector 94 which counts pulses produced by the encoder 116 as the shuttle assembly 14 and the frame 46 move past the sensing part of the encoder 116.

As best seen in FIG. 3 as well as in FIG. 2, the encoder 116 includes a sensing unit 122 mounted in a fixed location relative to the frame 46 and including a light emitting diode and a phototransistor. Mounted along a portion of the length of the frame 46 adjacent the sensing unit 122 is a strip 124 having a plurality of detectable indicia 126 spaced along the length thereof. In the present example the indicia 126 comprise marks or "fence posts" 128 etched in the finish of the strip 124. As the shuttle assembly 14 undergoes movement along the path of linear motion, the various fence posts 128 of the strip 124 extending along the frame 46 pass by the sensing unit 122 in such a way that they are illuminated by the light emitting diode within the sensing unit 122 and detected by the phototransistor within the sensing unit 122. Each detection of a fence post 128 by the phototransistor results in the generation of a pulse on the leads 118 and 120.

FIG. 4 shows the servo selector 94 and the servos 96, 98 and 100 in greater detail. The servo selector 94 includes a gap detector 134 and a counter 136, each of which is coupled to receive the fence post pulses from the encoder 116. As shown in FIG. 5A which depicts the fence post pulses from the encoder 116 during several reciprocating movements of the shuttle assembly 14, the generation of fence post pulses terminates shortly after the counterbalancing bar 54 contacts one of the springs 110 and 114 and does not resume until just prior to separation of the bar 54 from the spring 110 or 114. The encoder 116 produces 84 fence post pulses as the shuttle assembly 14 undergoes each sweep along the linear path of motion. The fence post pulses are counted by the counter 136 to keep a record of where the shuttle assembly 14 is located and to provide for switching between the various servos 96, 98 and 100 as the shuttle assembly 14 reaches various locations.

The gap detector 134 insures proper synchronization of the counter 136 when the shuttle drive 12 is initially started up. The shuttle assembly 14 is typically located somewhere between the 1st fence post and the 84th fence post of the encoder 116 upon startup. Accordingly, the counter 136 will count fewer than 84 fence post pulses before generation of the fence post pulses ceases. The gap detector 134 senses this and insures that the counter 136 begins counting with the 1st fence post at the end of the turnaround. Thereafter, as long as the counter 136 remains synchronized, it will count from the 1st fence post to the 84th fence post during each excursion of the shuttle assembly 14, and the gap detector 134 does not again come into play unless synchronization is lost or until the next time the shuttle drive 12 is initially started up.

The counter 136 determines which of the servos 96, 98 and 100 is applied to control the shuttle drive 12 in accordance with the fence post location of the shuttle assembly 14. Beginning with the 1st fence post, the counter 136 couples the linear servo 96 to control the shuttle drive 12. When the shuttle assembly 14 reaches the 81st fence post defining one of the opposite end locations, the counter 136 couples either the left turnaround servo 98 or the right turnaround servo 100 to control the shuttle drive 12 depending upon whether the shuttle drive is about to undergo a left turnaround or a right turnaround. When the counter 136 encounters the 1st fence post following the turnaround, the linear servo 96 is again coupled to control the shuttle drive 12.

This action is illustrated in FIG. 5A. At the left end of FIG. 5A, the shuttle assembly 12 is assumed to be traveling in a direction from right to left. When the counter 136 has advanced to a count of 81 denoting the occurrence of the 81st fence post, the linear servo 96 is uncoupled from the shuttle drive 12 in favor of the left turnaround servo 98. Somewhere between the 82nd and the 83rd fence posts, the counterbalancing bar 54 makes contact with the spring 114. As the 83rd and then the 84th fence posts are counted, the spring 114 is compressed causing the counterbalancing bar 54 to decelerate to rest. The bar 54 then rebounds from the spring 114 in the opposite direction and a point is reached where the counter 136 receives a 1st fence post pulse. At this point, control of the shuttle drive 12 is turned over from the left turnaround servo 98 to the linear servo 96. Somewhere between the 2nd and 3rd fence posts, contact between the bar 54 and the spring 114 terminates.

Following separation of the counterbalancing bar 54 from the spring 114, the counter 136 continues to count the fence post pulses that are provided by the encoder 116. When the 81st fence post is reached defining the opposite one of the pair of end locations, control of the shuttle drive 12 is turned over from the linear servo 96 to the right turnaround servo 100. Between the 82nd and the 83rd fence posts, the counterbalancing bar 54 contacts the spring 110. Thereafter the spring 110 is compressed as the bar 54 decelerates to rest and then rebounds in the direction from right to left. Thereafter, the counter 136 receives the 1st fence post pulse and responds by changing control of the shuttle drive 12 from the right turnaround servo 100 to the linear servo 96. Between the 2nd and 3rd fence posts, the counterbalancing bar 54 separates from the spring 110. The counter 136 continues to count fence post pulses until the 81st pulse has been counted, at which point control of the shuttle drive 12 is changed from the linear servo 96 to the left turnaround servo 98. The process then repeats itself in the manner just described.

In the present example the three different servos 96, 98 and 100 are comprised of common components shown in FIG. 4. Switching between the three different servos is provided by a signal from the counter 136 applied to an error signal modify 140. As described hereafter the error signal modify 140 determines the nature of the signal applied to the linear motor 16 as well as the manner in which any error between actual and desired speeds of the shuttle assembly 114 is modified in its application to drive the linear motor 16.

As seen in FIG. 4 the fence post pulses at the output of the encoder 116 are applied to a period timer 142 as well as to the gap detector 134 and the counter 136. The period timer 142 measures the time interval between each successive pair of fence post pulses from the encoder 116. The measured time interval representing the actual period between fence posts is compared by a comparator 144 with a reference period representing a desired nominal speed for the shuttle assembly 14. Any difference between the actual and reference periods is provided in the form of an error signal to the error signal modify 140.

When the counter 136 determines that the encoder 116 is somewhere between the 1st fence post and the 81st fence post during movement of the shuttle assembly 14 in either direction, the error signal modify 140 operates in such a way that the arrangement of FIG. 4 comprises the linear servo 96. The error signal modify 140 modifies each error signal from the comparator 144 in accordance with a predetermined algorithm prior to applying the error signal to a pulse duration modulator 146. The pulse duration modulator 146 couples a pulse generator 148 to an amplifier 150. The output of the amplifier 150 is coupled to the coils 86 and 88 comprising part of the linear motor 16 of the shuttle drive 12. The pulse duration modulator 146 provides a pulse duration modulated (PDM) signal to one input of the amplifier 150. A portion of the PDM signal is illustrated in FIG. 4. The pulse duration modulator 146 also provides a direction signal to a second input of the amplifier 150.

The PDM signal has a fixed period P which is determined by the frequency of the pulse generator 148. In the present example P is 32 microseconds. At 32 microsecond intervals the pulse generator 148 provides a thin, spike-like pulse to the pulse duration modulator 146. The pulse duration modulator 146 includes an eight bit storage register, seven bits of which represent the magnitude of the error signal from the comparator 144 as modified by the error signal modify 140 and one bit of which represents the direction or polarity of the error. The pulse duration modulator 146 also includes a counter the loading of which is initiated upon the occurrence of each pulse from the pulse generator 148. The counter then performs a count in accordance with the magnitude of the modified error signal so as to produce a pulse of desired duration D. At the end of each pulse, the counter is reset as it receives the next pulse from the pulse generator 148.

The PDM signal is applied to one input of the amplifier 150. The one bit within the storage register in the pulse duration modulator 146 representing the direction of the error is applied in the form of a direction signal to the other input of the amplifier 150. The amplifier 150 acts as a switching amplifier by applying the PDM signal to the linear motor 16 in a polarity which is determined by the direction signal.

When the output of the counter 136 within the servo selector 94 causes the error signal modify 140 to operate the arrangement of FIG. 4 as the linear servo 96, the error signal modify 140 modifies each error signal from the comparator 144 in accordance with the algorithm:

$$PDM = A(E + \alpha E_0 - \beta PDM_0)$$

where PDM is the new modified error signal (percentage duty cycle) being provided to the pulse duration modulator 146, A is a gain factor, E is the new error signal from the comparator 144, $\alpha$ is a coefficient, $E_0$ is the immediately prior error signal from the comparator 144, $\beta$ is a coefficient and $PDM_0$ the immediately prior or old PDM signal. The gain A and the coefficients $\alpha$ and $\beta$ are chosen based on a careful analysis of the servo system of FIG. 4 to optimize error minimization and correction.

FIG. 5B depicts the output of the amplifier 150. It will be seen that when the arrangement of FIG. 4 is operating as the linear servo 96, the output of the amplifier 150 comprises the PDM signal from the pulse duration modulator 146 having a polarity determined by the direction signal from the pulse duration modulator 146. For convenience of illustration a few PDM signal pulses are shown as being generated within each fence post interval. In actuality as many as twelve or more PDM signal pulses occur within each interval between adjacent fence posts since the period of the pulses in FIG. 5B is 32 microseconds in duration and the time distance between adjacent fence posts is typically 400–800 microseconds.

When the counter 136 has counted the 81st fence post pulse from the encoder 116, the error signal modify 140 responds by changing the operation of the arrangement of FIG. 4 from the linear servo 96 to that of either the left turnaround servo 98 or the right turnaround servo 100 depending upon the direction in which the shuttle assembly 14 is traveling. Referring to the left portion of FIG. 5B the shuttle assembly 14 is traveling from right to left as the 81st fence post is detected. At this point the error signal modify 140 causes the arrangement of FIG. 4 to operate as the left turnaround servo 98. The error signal modify 140 ignores any subsequent error signals from the comparator 144 in response to the 82nd and subsequent fence posts. At the same time, the error signal modify 140 provides to the linear motor 16 a turnaround signal of predetermined waveform and value totally independent of the actual speed of the shuttle assembly 14. The turnaround signal consists of a pair of pulses of opposite polarity such that the first pulse aids in driving the counterbalancing bar 54 into the spring 114 as the bar 54 rapidly decelerates to rest and the second pulse is designed to aid in accelerating the counterbalancing bar 54 in the opposite direction as the bar 54 rebounds from the spring 114.

The pulses comprising the turnaround signal are carefully chosen based on previous turnarounds at the same spring so as to replace friction losses occuring during the turnaround so that the shuttle assembly 14 accelerates back to the desired nominal velocity in the most expeditious way possible. The error signal modify 140 produces a first one of the turnaround pulses 152 of negative polarity by causing the pulse duration modulator 146 to produce a pulse of 32 microsecond duration in response to each pulse from the pulse generator 148 until the error signal modify 140 determines that the large continuous pulse 152 is to be terminated. At the same time, the error signal modify 140 causes the pulse duration modulator 146 to provide a direction signal which indicates the negative polarity of the pulse 152. Thereafter, a second one 154 of the pulses of the turnaround signal is produced. Again, the error signal modify 140 causes the pulse duration modulator 146 to produce a succession of back-to-back pulses of 32 microseconds duration with the direction signal to the amplifier 150 determining the positive polarity of the single large pulse 154.

Each turnaround signal is modified in accordance with a sample of shuttle assembly speed measured at the end of the immediately prior turnaround at the same end of the linear path of motion of the shuttle assembly 14. More specifically, the leading edge of the second of each pair of pulses comprising a turnaround signal is adjusted in accordance with the speed measurement taken during the prior turnaround using the algorithm:

$$W = W_0 + AE_0$$

where W is the width of the second pulse in a turnaround signal being generated, $W_0$ is the width of the second pulse applied during the prior turnaround of the shuttle assembly 14 at the same end, A is a gain factor and $E_0$ is the error signal generated in response to the speed measurement at the end of the prior turnaround at the same end.

Thus, following the generation of the pulses 152 and 154 during the left turnaround, the circuit arrangement of FIG. 4 reverts to operation as the linear servo 96. The error signal at the output of the comparator 144 produced in response to measurement of the time interval between the 3rd and 4th fence posts is stored by the error signal modify 140 and is used as $E_0$ during the next left turnaround. In the case of the pulse 154 shown in FIG. 5B the location of the leading edge 156 thereof was determined by the algorithm $W = W_0 + AE_0$ where $E_0$ was derived by measuring the time interval between the 3rd and 4th fence posts following the immediately prior left turnaround.

Following generation of the pulse 154, the error signal modify 140 responds to the sensing of the 1st fence post by the counter 136 by changing operation of the arrangement of FIG. 4 from that of the left turnaround servo 98 to that of the linear servo 96. This causes the arrangement of FIG. 4 to begin providing pulses of positive polarity to the linear motor 16 to drive the shuttle assembly 14 at the desired nominal speed. Again, the error signal generated in response to the measured time interval between the 3rd and 4th fence posts is saved by the error signal modify 140 for use in determining the width of the second pulse of the next left turnaround signal.

The arrangement of FIG. 4 operates as the linear servo 96 until the counter 136 determines that the 81st fence post has occurred. At this point the error signal modify 140 reacts by causing the circuit arrangement of FIG. 4 to operate as the right turnaround servo 100. The error signal modify 140 generates a right turnaround signal of predetermined waveform and value comprised of a positive pulse 160 followed by a negative pulse 162 as shown in FIG. 5B. As in the case of the pulses 152 and 154, the pulses 160 and 162 are provided independent of the actual speed of the shuttle assembly 14 and are designed to compensate for friction losses during the right turnaround so that the shuttle assembly 14 quickly accelerates following turnaround to the desired nominal speed. The leading edge 164 of the second pulse 162 is located in accordance with the algorithm $W - W_0 + AE_0$ where $E_0$ is the error signal generated in response to the measured time interval between the 3rd and 4th fence posts following the immediately preceding right turnaround. Following generation of the pulse 162, the 1st fence post is encountered by the counter 136 and the arrangement of FIG. 4 begins again to operate as the linear servo 96 with the amplifier 150 thereafter providing a series of negative PDM signal pulses as shown to drive the shuttle assembly 14 at the desired nominal velocity from right to left.

One arrangement for implementing the circuit of FIG. 4 is shown in basic block diagram form in FIG. 6 in conjunction with the pulse duration modulator 146. Such arrangement includes a counter/timer 170, a CPU (central processing unit) 172, a program memory 174 and a RAM (random access memory) 176. The counter/timer 170 is assumed to comprise a four channel counter/timer integrated circuit chip of the type shown and described hereafter. As such, the counter/timer 170 functions in conjunction with the CPU 172 to provide the gap detector 134, the counter 136, the period timer 142 and the comparator 144. Two of the four channels within the counter/timer 170 in conjunction with the CPU 172 are used to measure the period between fence post pulses from the encoder 116, while a third channel is used to determine when a fence post pulse has occurred and count the fence post pulses. The channels in conjunction with the CPU 172 function as a timer which measures the time elapsed from the occurrence of each fence post pulse to the occurrence of the immediately following fence post pulse to determine the actual period. The channels in conjunction with the CPU 172 also function as a counter to determine which fence post has occurred and thereby the location of the shuttle assembly 14. The actual period is compared with the reference period by the CPU 172 and the counter/timer 170 using a subtractive technique so as to implement the comparator 144 and provide the error signal at its output. The fourth channel within the counter/timer 170 comprises the pulse generator 148.

The error signal modify 140 is provided by the CPU 172, the program memory 174 and the RAM 176. The program memory 174 identifies various sequences of operation which are to take place such as in implementing the algorithm $A(E + \alpha E_0 - \beta PDM_0)$. Values such as A, $\alpha$, $\beta$, $E_0$ and $PDM_0$ are stored in the RAM 176. Similarly, in the case of the turnaround algorithm $W_0 + AE_0$, the values of $W_0$, A and $E_0$ are stored in the RAM 176 while the instructions for executing the algorithm are stored in the program memory 174.

An actual example of the circuit of FIG. 6 which was constructed and successfully tested in accordance with the invention is shown in FIGS. 7-10.

FIG. 7 depicts the counter/timer 170. The counter/timer 170 is comprised of two identical counter/timer chips (CTC) 180 and 182. Each of the CTC chips 180 and 182 comprises an integrated circuit chip sold under the designation Z80A CTC by Zilog Corporation. The chip 180 provides two of the channels of the counter/timer 170 with the chip 182 providing the other two channels. The fence post pulses from the encoder 116 are applied to the terminals 21 and 23 of the chip 180. Except for power supplies, clock signals, reset signals and grounds, the remaining terminals of the chips 180 and 182 are coupled to the CPU 172.

Figure 8:
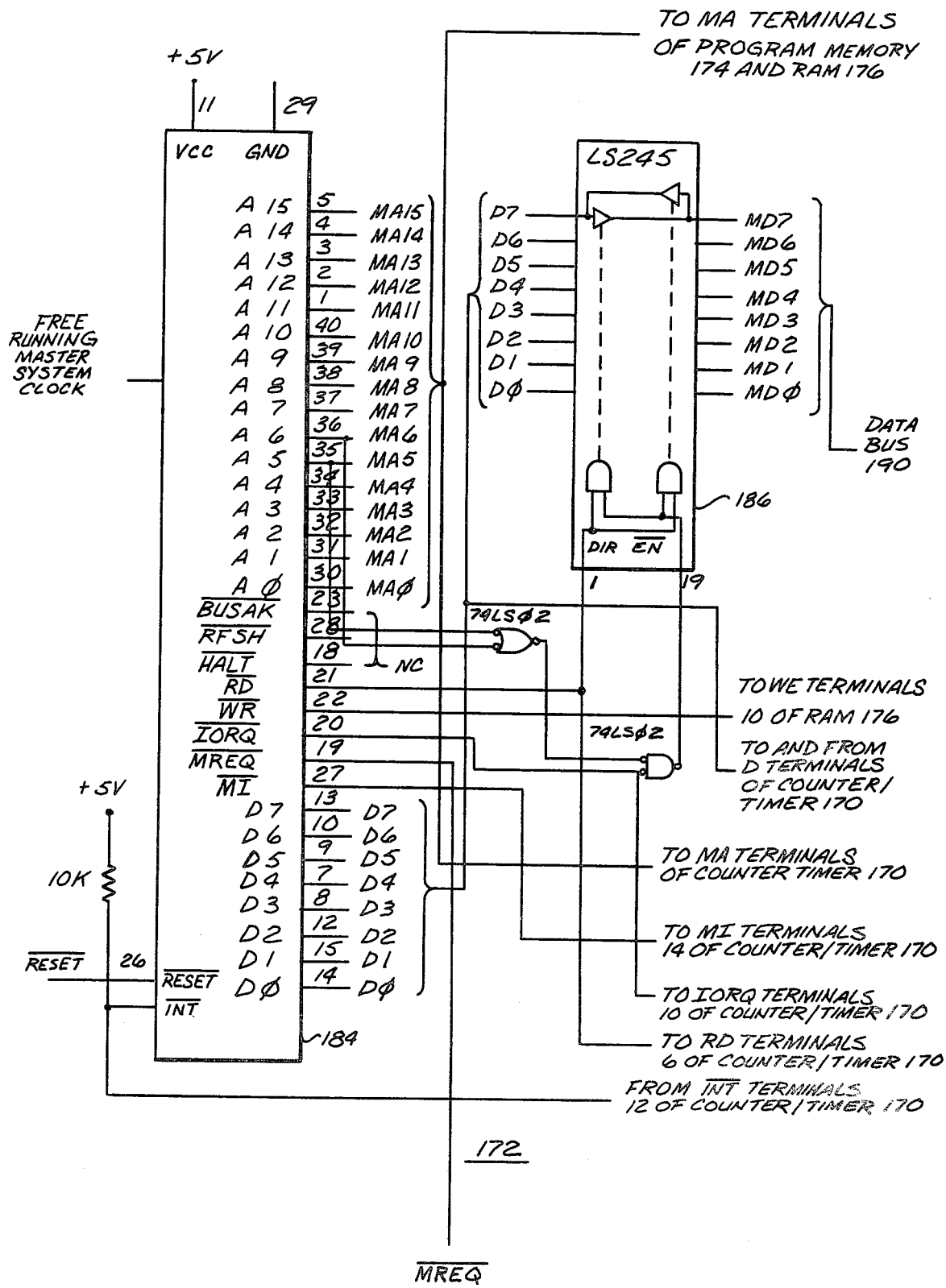
FIG. 8 is a schematic diagram of a circuit which may be used as the central processing unit (CPU) in the arrangement of FIG. 6.

FIG. 8 depicts the CPU 172. The CPU 172 is comprised of a CPU chip 184 sold under the designation Z80A CPU by Zilog Corporation. The CPU 172 also includes a chip 186 sold under the designation 74LS245 by Texas Instruments Corporation. The various D terminals of the CTC chips 180 and 182 of the counter/timer 170 are coupled to the D terminals of the chip 186 as well as to the various D terminals of the CPU chip 184. Various other terminals of the CTC chips 180 and 182 are coupled to various terminals of the CPU chip 184. The various MA terminals of the CPU chip 184 are coupled to the terminals of the program memory 174 and the RAM 176. The MD terminals of the chip 186 comprise a data bus 190 and are coupled to the various MD terminals of the program memory 174 and the RAM 176.

Figure 9:
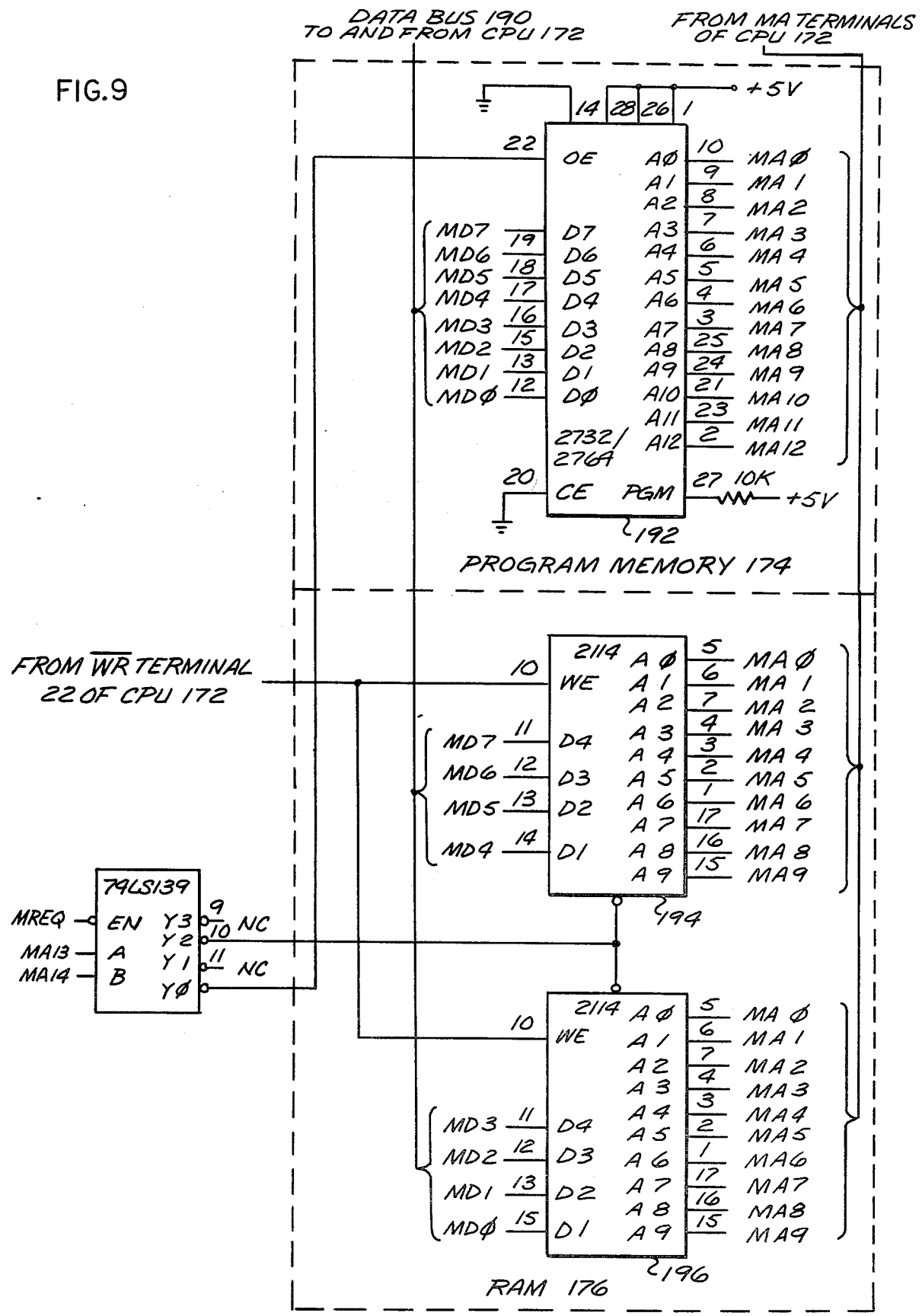
FIG. 9 is a schematic diagram of a circuit which may be used as the program memory and the RAM in the arrangement of FIG. 6.

FIG. 9 depicts the program memory 174 and the RAM 176. The program memory 174 is comprised of an integrated circuit chip 192 sold under the designation 2732 or 2764 by Intel Corporation. The RAM 176 is comprised of two different integrated circuit chips 194 and 196. The chips 194 and 196 are of the type sold under the designation 2114 by Intel Corporation. As previously noted the data bus 190 on the CPU 172 interconnects with the various MD terminals of the chips 192, 194 and 196. The various MA terminals of the CPU chip 184 are coupled to the MA terminals of the chips 192, 194 and 196. The chip 192 provides either a 4K or an 8K program memory depending upon the particular chip used. The two different chips 194 and 196 together provide a 1K RAM.

FIG. 10 depicts the pulse duration modulator 146 which provides the PDM and direction signals to the linear motor 16 via the amplifier 150. The pulse duration modulator 146 is comprised of an 8 bit register 198 and a counter 200. The 8 bit register 198 which stores seven bits indicating the magnitude of the modified error signal and one bit indicating the direction thereof is comprised of an integrated circuit chip 202 sold under the designation 74LS273 by Texas Instruments Corporation. The register 198 is coupled to the data bus 190 from the CPU 172. A terminal 204 on the chip 202 provides the direction signal. Seven of the terminals on the chip 202 are coupled to different ones of a pair of integrated circuit chips 206 and 208 which together comprise the counter 200. The chips 206 and 208 are each of the type sold under the designation 74LS163 by Texas Instruments Corporation. The counter 200 is reset at the beginning of each pulse from the pulse generator 148 and thereafter counts in accordance with the seven bits stored in the register 198 representing the magnitude of the error signal. A terminal 210 on the chip 208 provides the PDM signal.

Figure 11:
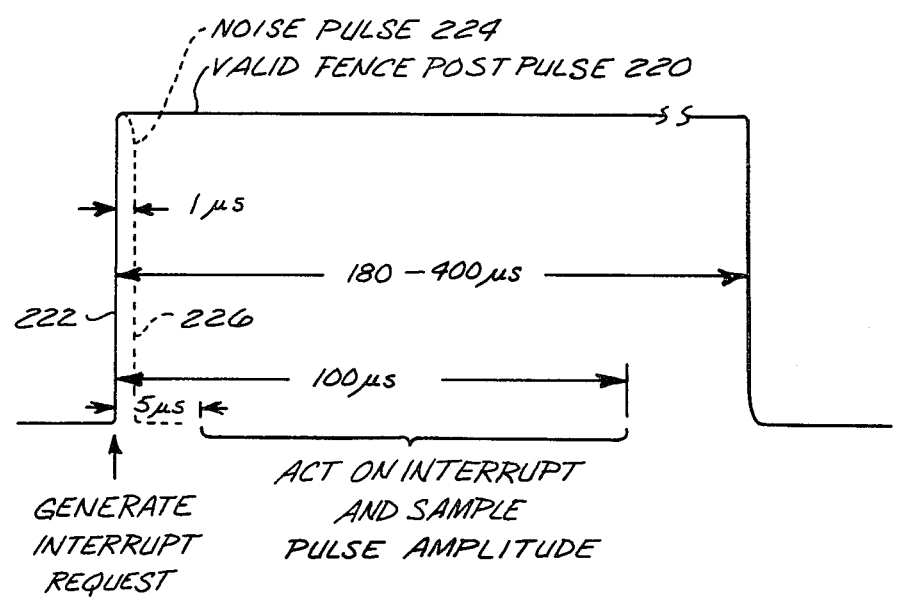
FIG. 11 is a waveform useful in explaining how valid fence post pulses are distinguished from noise pulses in accordance with the invention.

FIG. 11 depicts the manner in which valid fence post pulses are distinguished from noise pulses in accordance with the invention. It is relatively common for high frequency noise pulses of amplitude close to or even greater than the amplitude of valid fence post pulses to be provided the counter/timer 170 by the encoder 116. It is necessary to distinguish the valid fence post pulses from noise pulses so that the counter/timer 170 does not respond to a noise pulse as though it were a valid fence post pulse.

FIG. 11 depicts a valid fence post pulse 220 which is typically of 180-400 microsecond duration. A leading edge 222 of the valid fence post pulse 220 causes the counter/timer 170 to generate an interrupt request to the CPU 172. FIG. 11 also depicts a noise pulse 224 which is assumed to have the leading edge 222 and which has a trailing edge 226 shown in dotted outline. The noise pulse 224 is shown as having an amplitude equal to that of the valid fence post pulse 220 and has a typical width of 1 microsecond. The leading edge 222 of the noise pulse 224 would also cause the counter/timer 170 to generate an interrupt request to the CPU 172.

Within approximately 5-100 microseconds of generation of the interrupt request to the CPU 172, the request is acted on by the CPU 172 using instructions stored in the program memory 174. In accordance with the invention these instructions cause the CPU 172 to sample the pulse which generated the interrupt request by comparing the amplitude of the pulse with a digital threshold. In the case of the valid fence post pulse 220 the amplitude thereof at a sampling time 5-100 microseconds after the leading edge 222 is well above the digital threshold, and the CPU 172 and the counter/timer 170 respond by continuing to process the pulse 220 as a valid fence post pulse. In the case of a typical noise pulse such as the pulse 224, however, the amplitude of such pulse is usually zero or in any event well below the digital threshold when the amplitude thereof is sampled 5-100 microseconds after the interrupt is requested. When the pulse amplitude is determined to be less than the digital threshold, the CPU 172 and the counter/timer 170 disregard the pulse and do not continue processing as they would in the case of a valid fence post pulse.

We claim:

1. An arrangement for driving a linear motor which undergoes movement along a linear path of motion and then rebounds from a stop member at the end of the linear path of motion, the arrangement comprising the combination of first means responsive to periodic samplings of the speed of the linear motor at predetermined locations along the length of the linear path of motion for energizing the linear motor so as to attempt to drive the linear motor at a predetermined speed, the first means being rendered inoperative when the linear motor reaches a predetermined location adjacent the end of the linear path of motion, and second means responsive to reaching of the predetermined location adjacent the end of the linear path by the linear motor for applying an energizing signal of predetermined waveform to the linear motor to drive the linear motor through rebounding of the linear motor from the stop member, the energizing signal of predetermined waveform being generated independently of the position of the linear motor following reaching of the predetermined location adjacent the end of the linear path of motion by the linear motor.

2. The invention set forth in claim 1, wherein the linear motor also rebounds from a second stop member located at a second end of the linear path of motion opposite the first-mentioned end, and the first means is also rendered inoperative when the linear motor reaches a second predetermined location adjacent the second end of the linear path of motion, and further including third means responsive to reaching of the second predetermined location adjacent the second end of the linear path by the linear motor for applying an energizing signal of predetermined waveform to the linear motor to drive the linear motor through rebounding of the linear motor from the second stop member, the energizing signal of predetermined waveform being generated independently of the position of the linear motor following reaching of the second predetermined location adjacent the second end of the linear path by the linear motor.

3. An arrangement for driving a linear motor in reciprocating fashion along a linear path between opposite elastromeric elements from which the linear motor rebounds at opposite ends of the linear path comprising the combination of a first servo system for driving the linear motor between predetermined locations at the opposite ends of the linear path, the first servo system including means for determing the speed of the linear motor at a succession of locations along the linear path and means responsive to each determination of the speed of the linear motor for driving the linear motor in accordance with the difference between the determined speed and a desired speed, the first servo system being rendered inoperative when the linear motor goes beyond each of the predetermined locations from the linear path, and a second servo system for driving the linear motor when the linear motor is beyond either of the predetermined locations at the opposite ends of the linear path, the second servo system applying a signal of predetermined waveform to the linear motor, the signal of predetermined waveform being generated independently of the position of the linear motor as the linear motor goes beyond either of the predetermined locations at the opposite ends of the linear path.

4. The invention set forth in claim 3, wherein the first and the second servo systems together include an encoder, the encoder including a plurality of spaced-apart, detectable indicia along a portion of the length of the linear motor and sensor means mounted in a fixed location relative to the linear motor for sensing passing of the detectable indicia relative thereto, and the first servo system determines the speed of the linear motor in accordance with the time interval between the passage of each adjacent pair of the detectable indicia relative to the sensor means.

5. The invention set forth in claim 4, wherein the second servo system measures the time interval between and adjacent pair of the detectable indicia following each rebounding of the linear motor form one of the elastomeric elements and uses the measured time interval to adjust the signal of predetermined waveform applied to the linear motor during the next rebounding of the linear motor from the same one of the elastomeric elements.

6. An arrangement for driving an elongated element in reciprocating fashion along a linear path comprising the combination of a motor for driving the elongated element in response to an applied signal, means defining a succession of different locations of the elongated element along the linear path including a pair of opposite end locations adjacent the opposite ends of the linear path, means for measuring the time interval between the occurrences of each adjacent pair of the succession of different locations as the elongated element is driven along the linear path, means for comparing each measured time interval with a reference value to determine an error signal, means for applying the error signal to the motor when the linear element is between the pair of opposite end locations, the error signal being removed from the motor when the linear element is beyond either of the pair of opposite end locations and means responsive to the elongated element reaching either of the pair of opposite end locations for applying a turnaround signal of predetermined value to the motor to drive the motor through rebounding of the motor from an adjacent one of a pair of opposite stops.

7. The invention set forth in claim 6, wherein the means for applying a turnaround signal of predetermined value includes means for storing a measured time interval representing the speed of the elongated element following each rebounding of the motor from one of the opposite stops and means for applying the stored measured time interval to adjust the predetermined value of the turnaround signal applied to the motor the next time the motor rebounds from that one of the opposite stops.

8. The invention set forth in claim 7, wherein each turnaround signal is comprised of a pair of pulses of opposite polarity and the means for applying the stored measured time interval to adjust the predetermined value is operative to adjust the leading edge of the second one of the pair of pulses in accordance with the value of the stored measured time interval.

9. In a system in which a linear motor reciprocates along a linear path of motion and periodically rebounds from a stop member at an end of the linear path of motion, an arrangement for driving the linear motor through each rebounding thereof from the stop member comprising the combination of means for measuring the speed of the linear motor during each rebounding of the linear motor from the stop member, means for storing a representation of the measured speed of the linear motor, means for applying a waveform of predetermined value to drive the linear motor each time the linear motor reaches the end of the linear path of motion and means for altering the value of the waveform to be applied to drive the linear motor each time the linear motor reaches the end of the linear path of motion in accordance with the representation of speed measured and stored during the immediately prior rebounding of the linear motor from the stop member.

10. The invention set forth in claim 9, wherein the waveform of predetermined value comprises a pair of pulses of opposite polarity and the means for altering the value of the waveform is operative to vary the position of the leading edge of the second of the pair of pulses in accordance with the representation of speed measured and stored during the immediately prior rebounding of the linear motor from the stop member.

11. A linear motor arrangement comprising:
and elongated arrangement mounted to undergo linear motion between opposite limit positions;
an electromagnetic motor coupled to drive the elongated arrangement in either of opposite directions;
means for generating a position pulse each time the elongated arrangement passes through each of a succession of positions;
means for measuring the time interval between each position pulse and the immediately following position pulse;
means for comparing each measured time interval with a reference time interval to provide an error signal in accordance with the difference therebetween;
means for providing motor drive pulses to the electromagnetic motor;
means responsive to the error signal for varying the durations of the motor drive pulses in accordance with the error signal;
means for counting the position pulses following each reversal in direction of the elongated arrangement and
means responsive to the counting of a predetermined number of the position pulses for replacing the motor drive pulses with a pulse waveform of predetermined value to reverse the direction of the elongated arrangement.

12. The invention set forth in claim 11, further including a pair of opposite springs disposed to be impacted by the elongated arrangement to reverse the direction of the elongated arrangement, and wherein the predetermined pulse waveform is selected to replace energy lost when the elongated arrangement impacts either of the pair of opposite springs.

13. The invention set forth in claim 11, further including means for modifying each error signal in accordance with a predetermined algorithm which includes the immediately prior error signal.

14. The invention set forth in claim 11, further including means for storing the error signal from the means for providing an error signal at the end of each reversal in the direction of the elongated arrangement and means for modifying the predetermined pulse waveform in accordance with a predetermined algorithm which includes the error signal stored following the prior reversal in direction of the elongated arrangement at the same one of the opposite limit positions.

* * * * *

UNITED STATES PATENT AND TRADEMARK OFFICE
CERTIFICATE OF CORRECTION

PATENT NO. : 4,463,300
DATED : July 31, 1984
INVENTOR(S) : David W. Mayne et al

It is certified that error appears in the above-identified patent and that said Letters Patent are hereby corrected as shown below:

Column 1, line 13, after "B." and before "and", "Bararus" should read --Barrus--. Column 4, line 2, after "ing" and before "in", insert --drawings--; line 14, after "operation" and before "of", strike the comma (","). Column 9, line 64, after "144," and before "is" (first occurrence), "$\Delta$" should read --$\alpha$--. Column 12, line 64, after "the" (first occurrence) and before "terminals" insert --MA--. Column 14, line 62, after "for" and before "the" (first occurrence), "determing" should read --determining--. Column 15, line 24, after "motor" and before "one", "form" should read --from--. Column 16, line 42, after "arrangement" insert a semicolon (--;--).

Signed and Sealed this

Eighteenth Day of December 1984

[SEAL]

Attest:

Attesting Officer

GERALD J. MOSSINGHOFF

*Commissioner of Patents and Trademarks*